United States Patent
Heideman et al.

(10) Patent No.: US 7,146,087 B2
(45) Date of Patent: Dec. 5, 2006

(54) LOW MODAL BIREFRINGENT WAVEGUIDES AND METHOD OF FABRICATION

(75) Inventors: Rene Gerrit Heideman, Oldenzaal (NL); Marcel Hoekman, Enschede (NL)

(73) Assignee: LioniX BV (NL)

( * ) Notice: Subject to any disclaimer, the term of this patent is extended or adjusted under 35 U.S.C. 154(b) by 96 days.

(21) Appl. No.: 10/756,627

(22) Filed: Jan. 13, 2004

(65) Prior Publication Data

US 2005/0152660 A1    Jul. 14, 2005

(51) Int. Cl.
  *G02B 6/10* (2006.01)
(52) U.S. Cl. .................... 385/131; 385/130; 385/129
(58) Field of Classification Search .................. 385/131
  See application file for complete search history.

(56) References Cited

U.S. PATENT DOCUMENTS

| | | | |
|---|---|---|---|
| 5,497,445 A | 3/1996 | Imoto | |
| 5,732,179 A | 3/1998 | Caneau et al. | |
| 6,501,895 B1 * | 12/2002 | Bloechl et al. | 385/129 |
| 6,580,864 B1 | 6/2003 | Temkin et al. | |
| 6,704,487 B1 * | 3/2004 | Parhami et al. | 385/129 |
| 6,826,345 B1 * | 11/2004 | Zhong et al. | 385/129 |
| 2002/0048443 A1 * | 4/2002 | Itoh et al. | 385/132 |
| 2002/0122651 A1 * | 9/2002 | Roberts | 385/132 |
| 2003/0031445 A1 | 2/2003 | Parhami et al. | |
| 2003/0190131 A1 * | 10/2003 | Barth | 385/129 |

FOREIGN PATENT DOCUMENTS

| | | |
|---|---|---|
| EP | 1219983 A | 7/2002 |
| EP | 1265084 A | 12/2002 |
| WO | WO 02/059662 A | 8/2002 |

OTHER PUBLICATIONS

Zhang, et al., Res. Stress Charact. of Thick PECVD TEOS Film for Power MEMS Apps, Proc. Solid-State Sensor and Actuator Workshop, Hilton Head, SC, Jun. 4-8, 2000.
Smith, et al., Monolithic integration of waveguide structures with surface-micromachined polysilicon actuators, Smart Structures and Materials, Feb. 1996.
McCann, et al., Conformal deposition of LPCVD TEOS, Micromachining and Micro-fabrication Process Technology, SPIE, Oct. 2001.
Ridder, et al., Sil. Oxynit. Planar Waveguiding Struct. for Application in Opt. Comm., IEEE J. of Sel. Top. in Quant. Elect, Dec. 1998, pp. 930-936, vol. 4, No. 6, IEEE, USA.
WACH, PCT Search Report, Aug. 8, 2005.

* cited by examiner

*Primary Examiner*—Sung Pak
(74) *Attorney, Agent, or Firm*—DeMont & Breyer, LLC (57) ABSTRACT

The illustrative embodiment of the invention is a surface waveguide having low modal birefringence. The surface waveguide has a composite guiding region that is sandwiched by a lower cladding layer and an upper cladding layer, wherein the cladding layers serve to confine propagating light to the composite guiding region. In accordance with the illustrative embodiment, the composite guiding region is structured so that it exhibits a balanced stress configuration, wherein the stress in the direction that aligns with the $T_E$ polarization mode is substantially equal to the stress in the direction that aligns with the $T_M$ polarization mode. The balanced stress configuration results in a surface waveguide that exhibits very low modal birefringence.

31 Claims, 7 Drawing Sheets

LOW MODAL BIREFRINGENT WAVEGUIDES AND METHOD OF FABRICATION

FIELD OF THE INVENTION

The present invention relates to optical waveguides in general, and, more particularly, to surface waveguides.

BACKGROUND OF THE INVENTION

A surface waveguide is a light-guiding element, much like an optical fiber, which is formed on the surface of a rigid substrate. Although constrained to the substrate, the surface waveguide can traverse any path in the plane of the surface including curves, loops, and relatively sharp corners, subject to design constraints based on the optical properties of the materials used to form the surface waveguide. Surface waveguides are widely used in many applications including telecommunications, chemical sensing, and force sensing.

A surface waveguide is characterized as having a central region or "core" and a surrounding "cladding." An optical signal travels through a surface waveguide as an optical mode propagating through the core. The optical signal is confined to the core by the cladding. The guiding property of a surface waveguide stems from a difference in the speed at which light travels in the material of the core versus the material of the cladding. Light travels at different speeds in different materials, and every material has a "refractive index," n, which is a measure of the speed of light in that material versus the speed of light in vacuum.

When light traveling in one material hits a boundary of a new material with a different refractive index, the light will reflect off the boundary, be bent (i.e., refract, as in a prism), pass through into the new material, or some combination thereof. The amount of light that is reflected, as compared to the amount of light that passes into the new material depends on the relative refractive indices of the materials and the angle at which the light hits the boundary. In the case of a surface waveguide, the refractive index of the cladding is typically only slightly lower than the refractive index of the core. Furthermore, light traveling in the core travels in a direction that is nearly parallel to the interface between the core and the cladding. Therefore, when light traveling in the core hits the boundary with the cladding, nearly all of the light bounces back into the core in the same way that a flat stone bounces off the surface of a pond when it's skipped. The propagating mode is, therefore, effectively confined to the core.

Surface waveguides can be fabricated in various forms including slab waveguides, ridge waveguides, and stripe waveguides. A slab waveguide comprises a planar thin film of optical core material sandwiched between two planar thin films of cladding material. The cladding material above and below the core slab confine the propagating optical mode in the vertical direction, but not in the horizontal direction.

A ridge waveguide is similar to a slab waveguide, but in addition to a slab region also includes a protruding ridge of material through which an optical mode propagates. The lateral and vertical structure substantially confines the mode in both dimensions, except where the ridge meets the slab. It is possible that a mode can exist in the slab area outside the ridge portion.

A stripe waveguide is a ridge waveguide wherein the slab layer has been etched completely away except in the ridge area. Since there is no core material anywhere except in the stripe, an optical mode will propagate only in the core.

The material used for the core and cladding are chosen based on their relative optical properties. Surface waveguides have been formed from a variety of materials, including different types of glasses (e.g., silicon dioxide, boro-phosphosilicate glass, phosphosilicate glass, etc.), silicon nitrides, silicon oxy-nitrides, gallium arsenide, indium phosphide, silicon, and lithium niobate. These materials are used in combination to enhance the guiding ability of the surface waveguide. The most common surface-waveguide material is glass, wherein core and cladding glasses are doped with different impurities or different concentrations of the same impurity in order to make the refractive index of the cladding glass slightly lower than the refractive index of the core glass to provide light-guiding capability.

The surface waveguide is formed by successively depositing and patterning thin films of optical materials onto the surface of a substrate. Low pressure chemical vapor deposition (LPCVD) is a common method of forming the thin-film layers. In an LPCVD system, the glass is deposited onto the surface of a silicon wafer in high temperature furnaces into which different precursor gasses are injected, resulting in a chemical reaction that deposits glass on the silicon wafer surface.

The deposition conditions and the types of gasses can be changed to produce various glass types having different optical and mechanical properties. In addition, deposition conditions and precursor-gas type affect the way the resulting film covers features on the surface. Certain gas mixtures or materials are known to result in what are called "conformal" layers, wherein the thickness of the deposited film is nearly uniform over underlying structure. Materials that deposit conformally during LPCVD include polycrystalline silicon, silicon dioxide deposited using a precurser gas of tetraethylorthosilicate, (this type of silicon dioxide will hereinafter be referred to as "TEOS"), and stoichiometric silicon nitride (silicon nitride that has the exact formulation of three silicon to every four nitrogen atoms: $Si_3N_4$).

Unfortunately, conformally- and nonconformally-deposited thin films exhibit inherent residual stress due to the deposition process itself and due to the material characteristics of the films, such as differences in thermal expansion coefficients. If the underlying films or substrate include surface topography, then such stresses can be directionally dependent as well.

The refractive index of a pure, unstrained, non-crystalline material is always exactly the same at a specific temperature. For example, pure, unstrained silicon dioxide ($SiO_2$) has a refractive index of exactly 1.46 at room temperature (300 K). By adding an impurity (e.g., phosphorous, etc.) and controlling its concentration, however, the refractive index of silicon dioxide can be altered. Different concentrations or impurities are used to vary the refractive index as desired within materially-defined limits. The refractive index of most materials can be controlled in the same way, and the ability to control the refractive index in this manner is exploited in surface-waveguide and optical-fiber technology alike.

There are other factors that will cause the refractive index of a material to change. Some of these factors include a variation in temperature, internal stress caused by the presence of impurities, and mechanical strain. Often, these factors are directional, such as a thermal gradient through the thickness of a layer, differences in the vertical and horizontal dimensions of a waveguide, or a mechanical force applied in only one plane. As a consequence, the refractive index of such a material becomes directionally dependent.

That is, there are two refractive indices for the material. Such a material is said to be birefringent.

A surface waveguide supports the propagation of light that has two directionally-dependent components, referred to as polarization modes $T_E$ and $T_M$. These polarization modes are essentially flat sinusoidal waves that are orthogonal (i.e., physically oriented at right angles to each other), with the $T_E$ mode being horizontally oriented and the $T_M$ mode being vertically oriented. Due to directionally-dependent stress resulting from thin-film deposition, the polarization modes in a typical surface waveguide see significantly different refractive indices. This is known as "modal birefringence", and is quantified as $n_{TE}$-$n_{TM}$. Modal birefringence is particularly prevalent in ridge and stripe waveguides, wherein the core material is patterned to have a roughly square cross-section and subsequently over-coated with a conformal layer of cladding material, exacerbating stress and stress gradients present in the different layers.

Modal birefringence has thus far limited the utility of surface waveguide structures. For most applications using optical fibers or surface waveguides, it is necessary that the two polarization modes travel through the surface waveguide at the same speed. Divergence of the modes as they travel can lead to serious system complications for many applications. In a communications system, for example, it is well understood that dire consequences result from differences in the received optical power of the polarization modes, or the time at which the polarization modes are received, or when optical power transfers from one polarization mode to the other. It is highly desirable therefore, to form surface waveguides having low modal birefringence.

SUMMARY OF THE INVENTION

The illustrative embodiment of the present invention is a waveguide having low modal birefringence and a method for fabricating the waveguide. A waveguide in accordance with the illustrative embodiment has a composite guiding region that is sandwiched by a lower cladding layer and an upper cladding layer. The lower and upper cladding layers serve to confine propagating light to the composite guiding region in well-known fashion.

In accordance with the illustrative embodiment, the composite guiding region is structured so that it exhibits a "balanced stress configuration." This means that the stress in the direction that aligns with the $T_E$ polarization mode is substantially equal to the stress in the direction that aligns with the $T_M$ polarization mode. Since the stress configuration is balanced, the refractive indices seen by the $T_E$ and $T_M$ modes will be substantially equal. The result is a waveguide that exhibits very low modal birefringence.

In some embodiments, the composite guiding region comprises multiple optically-transparent layers that have different stress characteristics. The stress characteristics of the layers are selected to yield a balanced stress configuration. As a consequence, the amount of modal birefringence exhibited in the composite guiding region is independent of the transmission properties of the layers that compose it.

In the illustrative embodiment, the composite guiding region comprises three layers. The residual stresses of these layers are used to tailor the stress in the composite guiding region. In some embodiments, the materials chosen for these layers are selected so that stress characteristic of layers bottom and top layers is opposite in sign to the stress characteristic of the middle layer. In other words, if the middle layer exhibits compressive stress, then the bottom and top layers exhibit tensile stress and visa versa.

In some embodiments, the illustrative embodiment of the present invention comprises:
a composite guiding region having at least three layers, wherein:
two of said three layers have stress of the same sign;
said two layers are separated by one or more interposed layers;
said one or more interposed layers have stress of opposite sign relative to said two layers; and
said interposed layers are suitable for guiding light based on the relative refractive indices of said interposed layers and said two layers.

DETAILED DESCRIPTION

Figure 1:
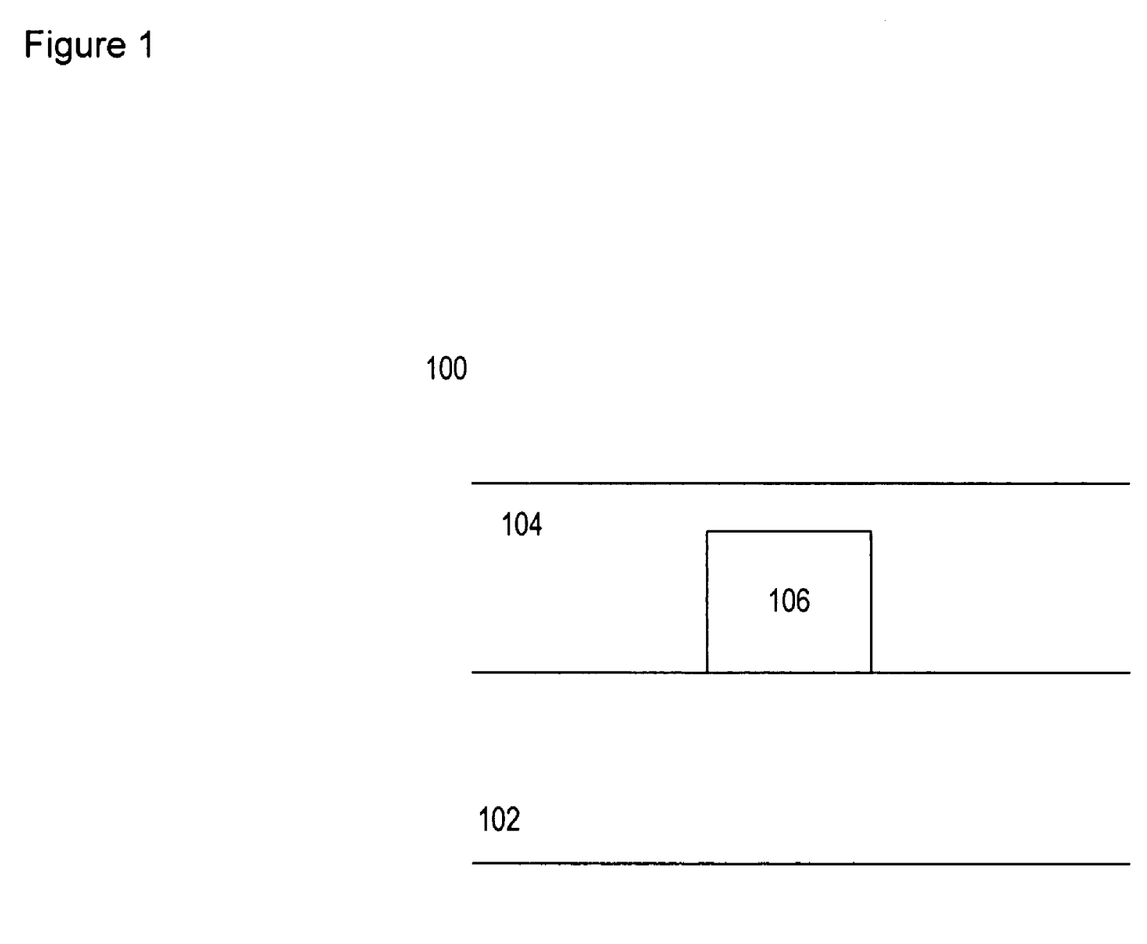
FIG. 1 depicts a cross-sectional view of a waveguide having a composite guiding region in accordance with the illustrative embodiment of the present invention.

FIG. 1 depicts a cross-sectional view of a portion of a stripe waveguide in accordance with the illustrative embodiment of the present invention. Stripe waveguide 100 comprises composite guiding region 106, which is surrounded by lower cladding layer 102 and upper cladding layer 104. The material(s) that compose lower cladding layer 102 and upper cladding layer 104 have a refractive index that is lower than the materials that compose composite guiding region 106. By virtue of this difference in refractive indices, the lower and upper cladding layers serve to confine propagating light to composite guiding region 106.

In accordance with the illustrative embodiment of the present invention, composite guiding region 106 is structured so that it exhibits a "balanced stress configuration." As used herein, the phrase "balanced stress configuration" means that the stress in the direction that aligns with the $T_E$ polarization mode is substantially equal to the stress in the direction that aligns with the $T_M$ polarization mode. If the stress configuration in a waveguide is balanced, then the refractive indices seen by the $T_E$ and $T_M$ modes will be substantially equal, or in other words, the waveguide will have low modal birefringence.

In some embodiments, composite guiding region 106 comprises multiple optically-transparent layers that have different stress characteristics. The stress characteristics of the layers are selected to yield a balanced stress configuration. As a consequence, the amount of modal birefringence exhibited in the composite guiding region is independent of the transmission properties of the layers that compose it. An example of a multi-layered composite guiding region is depicted in FIG. 2, which is a perspective view of stripe waveguide 200 having axis of signal propagation 214.

Figure 2:
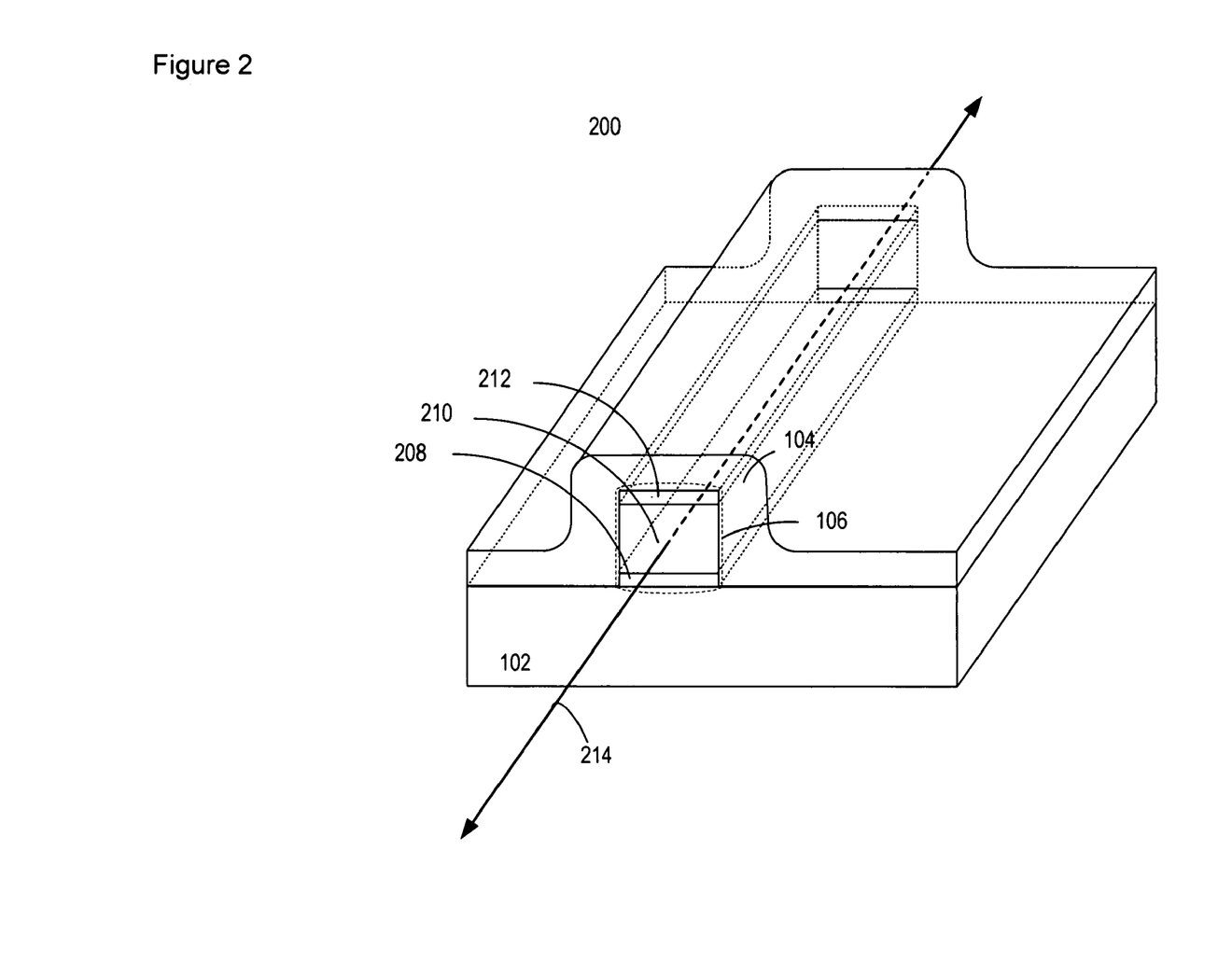
FIG. 2 depicts a perspective view of a waveguide in accordance with the illustrative embodiment, wherein the composite guiding region comprises a plurality of layers.

As depicted in FIG. 2, composite guiding region 106 comprises layers 208, 210, and 212. Layers 208 and 212 sandwich interposed layer 210. Composite guiding region 106 is itself sandwiched by lower cladding layer 102 and upper cladding layer 104.

Composite guiding region 106 can also be described as including an inner core (i.e., layer 210) and an outer core, wherein the outer core includes a lower portion (i.e., layer 208) and an upper portion (i.e., layer 212). While both descriptions are correct, one or the other might be preferable as being more descriptive of a particular variation of composite guiding region 106. These two alternate descriptions will be used interchangeably within this specification.

In stripe waveguide 200, the residual stresses of layers 208, 210 and 212 are used to tailor the stress in composite guiding region 106. In some embodiments, the materials chosen for layers 208, 210, and 212 are selected so that stress characteristic of layers 208 and 212 is opposite in sign to the stress characteristic of layer 210. In other words, if layer 210 exhibits, for example, compressive stress, then layers 208 and 212 exhibit tensile stress. Alternatively, if layer 210 exhibits tensile stress, then layers 208 and 212 exhibit compressive stress.

Figure 3:
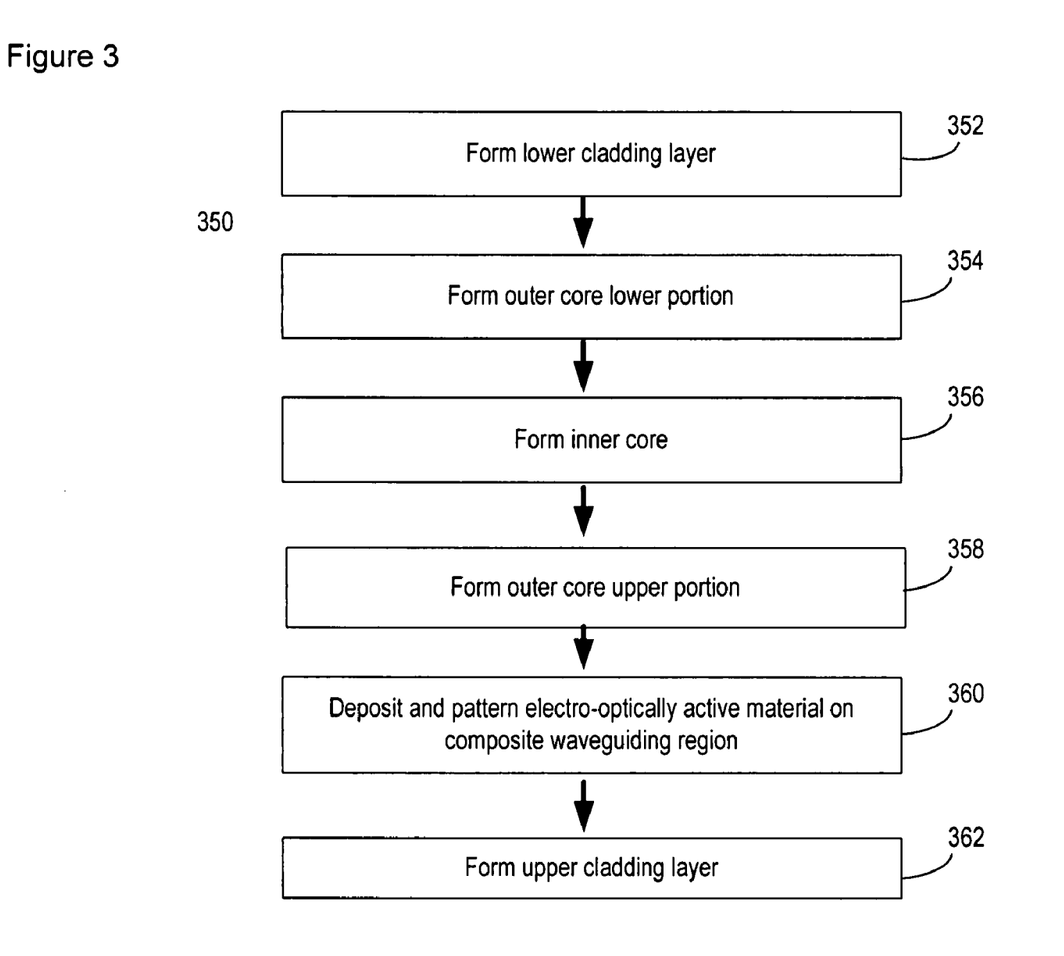
FIG. 3 depicts a method in accordance with the illustrative embodiment of the present invention.

FIG. 3 depicts method 350, suitable for forming a waveguide having a composite guiding region, such as composite guiding region 106 depicted in FIG. 2. Method 350 recites, in operation 352, forming a lower cladding layer (e.g., lower cladding layer 102, etc.). The lower cladding layer (in conjunction with the upper cladding layer) confines a propagating optical signal within the composite guiding region. In some embodiments, the lower cladding layer comprises silicon dioxide. A more extensive list of suitable materials is provided later in this specification.

In operation 354, the outer core lower portion (e.g., layer 208 in FIG. 2) is deposited or grown on the lower cladding layer. In other words, in operation 354, the bottom layer of composite guiding region 106 is formed. In some embodiments, such as a stripe waveguide, operation 354 includes the task of patterning the outer core lower portion. Compare FIG. 2, for example, wherein layer 208 is a patterned layer, with FIG. 5, an embodiment of a ridge waveguide, wherein layer 508 is not patterned.

In operation 356, a material that forms the inner core is deposited or grown on the outer core lower portion. The inner core corresponds to interposed layer 210 in FIG. 2. When forming a stripe or ridge waveguide, as depicted in the Figures that accompany this specification, operation 356 includes the task of patterning the inner core.

Implicit in operations 354 and 356 is that, in selecting materials for the layers, the inner core (interposed layer) exhibits a residual stress of opposite sign relative to that of the outer core lower portion.

In operation 358, the outer core is completed with the deposition or growth of the outer core upper portion (e.g., layer 212 in FIG. 2), wherein a layer of material is deposited or grown on the inner core. The outer core upper portion advantageously conforms to the underlying topography of the outer core lower portion and the patterned inner core. In some embodiments, operation 358 includes the task of patterning the outer core upper portion. As previously described, the lateral extent of the outer core upper portion affects the stress distribution (i.e., uniformity and directionality of stress) in the composite guiding region. Implicit in operation 358 is that, in selecting a material for the outer core upper portion, it exhibits a residual stress of the same sign as the outer core lower portion. In some embodiments, the upper and lower portions of the outer core are formed of the same material, while in some other embodiments, different materials are used for the two layers.

Method 350 also includes optional operation 360 wherein an electro-optic functionality is added. In some embodiments, operation 360 comprises depositing or growing, and then patterning, a layer of electro-optically active material on the composite guiding region (see, e.g., FIG. 6, layer 614). Suitable electro-optic materials include without limitation, zinc-oxide (ZnO), lead-zirconium titanate (PZT), lanthanum-doped PZT (PLZT), barium titanate, lithium niobate, and electro-optic polymers. In some embodiments, the electro-optically active material is zinc-oxide, which can be used to induce electro-optic effects such as piezo-electric, photo-elastic, acousto-optical effects.

In operation 362, an upper cladding layer (e.g., layer 104 in FIG. 2) is deposited or grown on the outer core upper portion (and/or the layer of electro-optically active material, if present).

Regarding materials selection, stoichiometric materials are well-suited for use in forming composite guiding region 106 because they exhibit a characteristic residual stress that is consistent regardless of the manner in which the materials are deposited. For example, stoichiometric silicon nitride exhibits residual tensile stress of approximately 1 GPa, thermally-grown silicon dioxide exhibits residual compressive stress of approximately 500 MPa, and TEOS exhibits residual compressive stress of approximately 300 MPa. In some embodiments, layer 210 comprises TEOS and layers 208 and 212 comprises stoichiometric silicon nitride. In some other embodiments, layer 210 comprises thermally-grown silicon dioxide and layers 208 and 212 comprise stoichiometric silicon nitride. In yet some additional embodiments, layer 210 comprises stoichiometric silicon nitride while layers 208 and 212 comprise silicon dioxide.

With the materials chosen in this manner, the thickness and lateral dimensions of each of layers 208, 210, and 212 are used to control the stress profile through the bulk of composite guiding region 106. In particular, the thickness of the layers are used to adjust the magnitude of the stress and the lateral dimensions of the layers affect the direction of the stress (i.e., along the axes that align with the $T_E$ polarization mode and the $T_M$ polarization mode) to obtain a balanced stress configuration in accordance with the present disclosure.

The calculation of the stress configuration in composite guiding region 106 is quite complex and usually performed using simulation software, such as OlympIOs, available from C2V of Enschede, The Netherlands. Layer thickness and lateral dimensions can be determined via simulation using a trial-and-error process. In particular, for a given structural configuration and materials, multiple simulations are performed wherein layer thickness is varied. The layer thickness that results in the smallest value for the difference between the $T_E$ polarization mode and the $T_M$ polarization mode provides the lowest modal birefringence. Those skilled in the art will know an approximate dimension for the various layer thicknesses, and these can be used as a starting point for the simulations.

It is understood by those skilled in the art that the residual stress and stress gradients of a thin-film layer is a function of many parameters, including, without limitation, the differences in the coefficients of thermal expansion between the deposited layer and underlying layers or substrate, the doping level of the layer, material structure, and deposition conditions. Those skilled in the art will know how to manipulate these parameters, in conjunction with the thickness and lateral dimensions, to achieve a balanced stress configuration.

A more extensive list of materials that are suitable for use as the upper and lower cladding layers as well as the layers of the composite guiding region includes, but is not limited to, stoichiometric silicon nitride, silicon dioxide, silicon, polysilicon, silicon carbide, silicon monoxide, silicon-rich silicon nitride, indium phosphide, gallium arsenide, indium-gallium arsenide, indium-gallium arsenide-phosphide, lithium niobate, silicon oxy-nitride, phosphosilicate glass, and borophosphosilicate glass. In addition, compounds such as silicon nitride are effectively different materials with different material properties when their composition is other than stoichiometric, and these different material compounds can be used in combination in similar fashion to those listed above. In view of the present disclosure, those skilled in the art will know to appropriately select materials, such as those listed above, as a function of their stress characteristic, to enable a balanced stress configuration in composite guiding region 106.

Figure 4A:
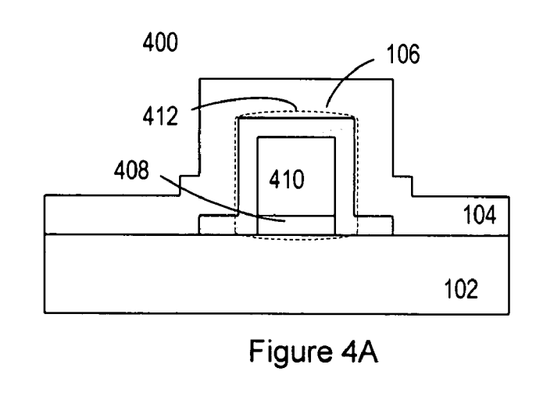
FIG. 4A depicts a first variation of the waveguide depicted in FIG. 2.

FIG. 4A depicts stripe waveguide 400, which is a variation of stripe waveguide 200. FIGS. 4B–4G depict stages in the fabrication of stripe waveguide 400.

Referring to FIG. 4A, stripe waveguide 400 comprises composite guiding region 106, which includes outer core lower portion 408, inner core 410, and outer core upper portion 412. Composite guiding region 106 is disposed on lower cladding 102 and covered by upper cladding 104.

Figure 4B:
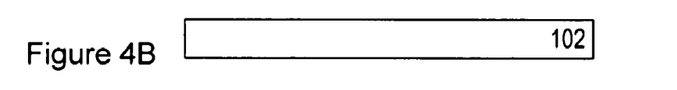
FIGS. 4B–4G depicts the waveguide of FIG. 4A at various stages of fabrication.

FIG. 4B depicts layer 102 of material (e.g., silicon dioxide, etc.) in nascent stripe waveguide 400. Layer 102 is deposited or grown on a substrate (not depicted). Layer 102 will serve as the lower cladding for stripe waveguide 400, See operation 352 of method 300.

Figure 4C:
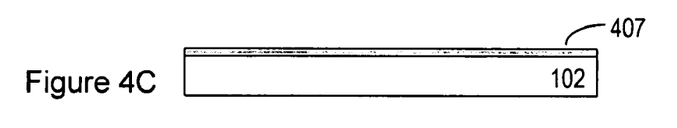

FIG. 4C depicts layer 407 of material, which is grown or deposited on layer 102. Layer 407 will form the outer core lower portion. See, operation 354 of method 300. In some embodiments, layer 407 is stoichiometric silicon nitride ($Si_3N_4$), which will deposit conformally on layer 102 in an LPCVD deposition furnace.

Figure 4D:
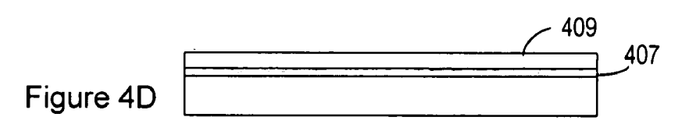

FIG. 4D depicts layer 409 of material, which is grown or deposited on layer 407. Layer 409 will form the inner core or interposed layer of composite guiding region 106. See, operation 356 of method 300. In some embodiments in which layer 407 is stoichiometric silicon nitride, layer 409 is TEOS. In such embodiments, layer 409 will deposit conformally on layer 407.

Figure 4E:
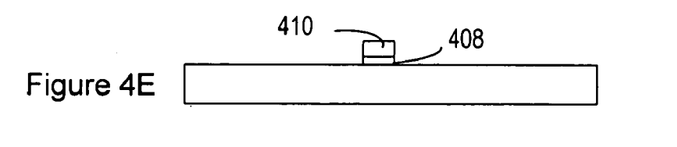

FIG. 4E depicts layers 407 and 409 after patterning, which defines the shape of outer core lower portion 408 and inner core 410 of composite guiding region 106. See operations 354 and 356 of method 300.

Figure 4F:
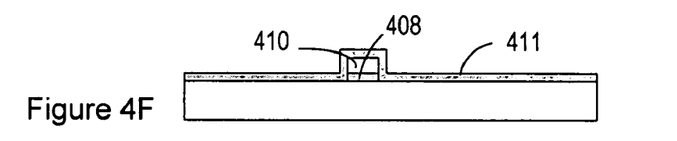

FIG. 4F depicts layer 411 of material, which is grown or deposited on the top and along the sides of inner core 410 and outer core lower portion 408. See, operation 358 of method 300. In some embodiments in which layer 407 is stoichiometric silicon nitride, layer 411 comprises a second conformal layer of stoichiometric silicon nitride. After deposition of layer 411, inner core 410 is completely surrounded by outer core material, thereby completing composite guiding region 106.

Figure 4G:
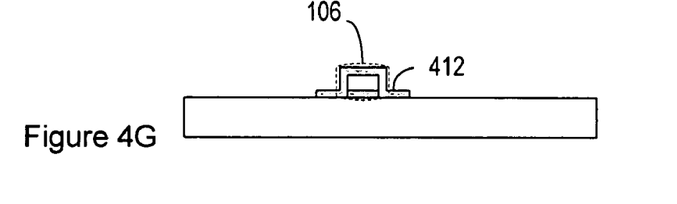

FIG. 4G depicts layer 411 after patterning, wherein the shape of outer core upper portion 412 is defined. See, operation 358 of method 300. The purpose of patterning outer core upper portion 412, which is an optional operation, is to tailor the effect that this portion of the outer core has on the stress distribution in composite guiding region 106. A goal of this tailoring being, of course, to reduce modal birefringence in stripe waveguide 400.

Stripe waveguide 400 takes final form as upper cladding 104 is grown or deposited on outer core upper portion 412. See, FIG. 4A and operation 362 of method 300. In some embodiments, upper cladding 104 is a combination of a second conformal layer of TEOS, and a layer of a different glass having a lower stress, such as boro-phosphosilicate glass (BPSG). In conjunction with lower cladding 102, upper cladding 104 confines propagating light to composite guiding region 106.

It will be clear to those skilled in the art, after reading this specification, how to make and use other embodiments of the present invention wherein the various layers of waveguide 400 are selected from other materials in the list of suitable materials provided above, as well as any other materials that are found to be suitable.

It will be also be clear to those skilled in the art, after reading this specification, how to make and use other embodiments of the present invention wherein outer core upper portion 412 extends a different distance along lower cladding 104, and how to make and use embodiments that utilize air, rather than a layer of material, as upper cladding 104.

Figure 5:
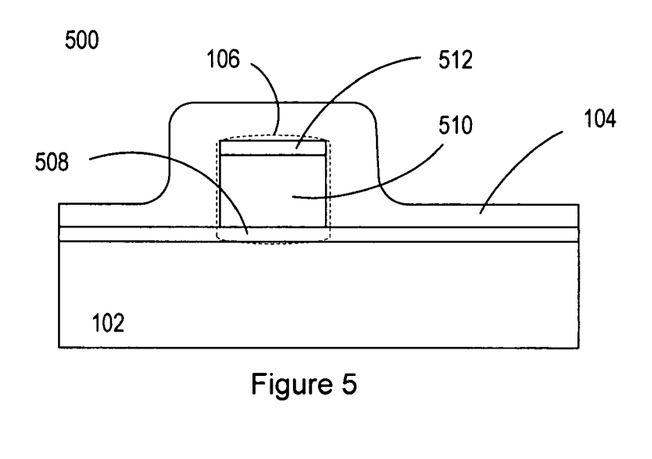
FIG. 5 depicts a second variation of the waveguide depicted in FIG. 2.

FIG. 5 depicts a cross-sectional view, orthogonal to the axis of signal propagation, of ridge waveguide 500, which is another variation of waveguide 200. In waveguide 500, composite guiding region 106 comprises a portion of layer 508, layer 510, and layer 512. Layer 508 forms the outer core lower portion and layer 512 is the outer core upper portion. The portion of layer 508 that is located directly below interposed layer 510 is a part of composite guiding region 106, while the remainder of layer 508 serves to tailor the stress configuration of the composite guiding region. Layer 102 serves as a lower cladding, and layer 104 serves as the upper cladding for waveguide 500. Although layer 508 is shown as extending to the edge of lower cladding 102, it will be clear to those skilled in the art, after reading this specification, how to make and use other embodiments of the present invention wherein layer 508 is patterned to extend any suitable distance from the edge of interposed layer 510.

Figure 6:
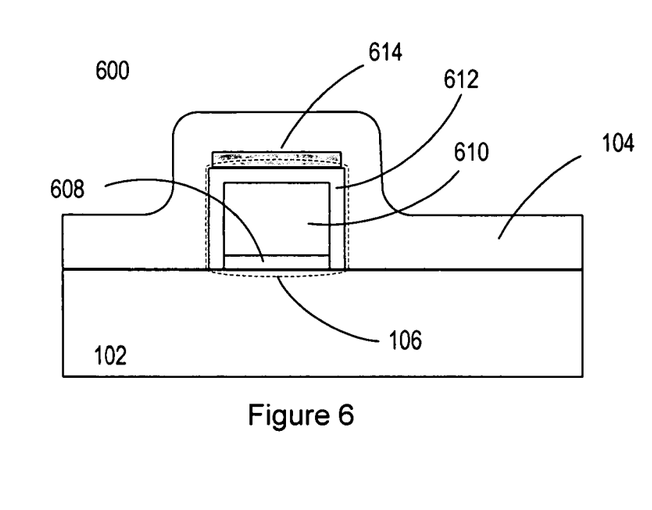
FIG. 6 depicts a third variation of the waveguide depicted in FIG. 2.

FIG. 6 depicts a cross-sectional view, orthogonal to the axis of signal propagation, of stripe waveguide 600, which is another variation of the waveguide 200. In waveguide 600, composite guiding region 106 comprises layer 608, interposed layer 610, and layer 612. Layer 612 is a conformal layer that covers the top and sides of interposed layer 610. The thickness of layer 612 is the substantially the same at both the top and sides of interposed layer 610. Layers 608 and 612 comprise an outer core and interposed layer 610 comprises an inner core. Consequently, the inner core and outer core collectively compose composite guiding region 106 of waveguide 600. Layer 102 serves as a lower cladding, and layer 104 serves as the upper cladding for waveguide 600. The addition of layer 612 to both the top and sides of interposed layer 610 enables greater control over the stress configuration in composite guiding region 106 since layer 612 affects the stress in interposed layer 610 in both lateral and vertical directions. Low modal birefringence in waveguide 600 is achieved via proper design of the geometry of composite guiding region 106 and by controlling the thickness of layers 608 and 612.

In waveguide 600, layer 612 is present only in composite guiding region 106. But in some other embodiments, layer 612 extends beyond the composite guiding region, and is disposed on at least a portion of layer 102. Its presence on layer 102 affects the stress configuration in composite guiding layer 106. The presence of layer 612 on layer 102, and the extent of its coverage, therefore provides an additional measure of control over stress in composite guiding layer 106. It will be clear to those skilled in the art, after reading this specification, how to make and use other embodiments of the present invention wherein layer 612 extends further along layer 102 (see, e.g., FIG. 4A).

Waveguide 600 also includes layer 614, which comprises an electro-optically active material. In some embodiments, layer 614 is zinc oxide. The electro-optically active material can be activated through an external electric field, applied perpendicular to the substrate, to induce a change in the effective index of waveguide 600. One benefit of the presence of electro-optically active material is an ability to dynamically correct for errors in fabrication or environmental variations such as temperature changes.

Furthermore, in accordance with the present invention, in some embodiments, electro-optically active material is incorporated into waveguide 600, or any of the other waveguides discussed herein, to create an attenuator, splitter, equalizer or like opto-electronic devices. To create a splitter, for example, a change in refractive index is induced to direct an optical signal along either one of two paths. In an attenuator or an equalizer (a multi-channel attenuator), refractive index is changed to alter guiding properties, and, ultimately, the received signal strength of the optical signal.

Figure 7:
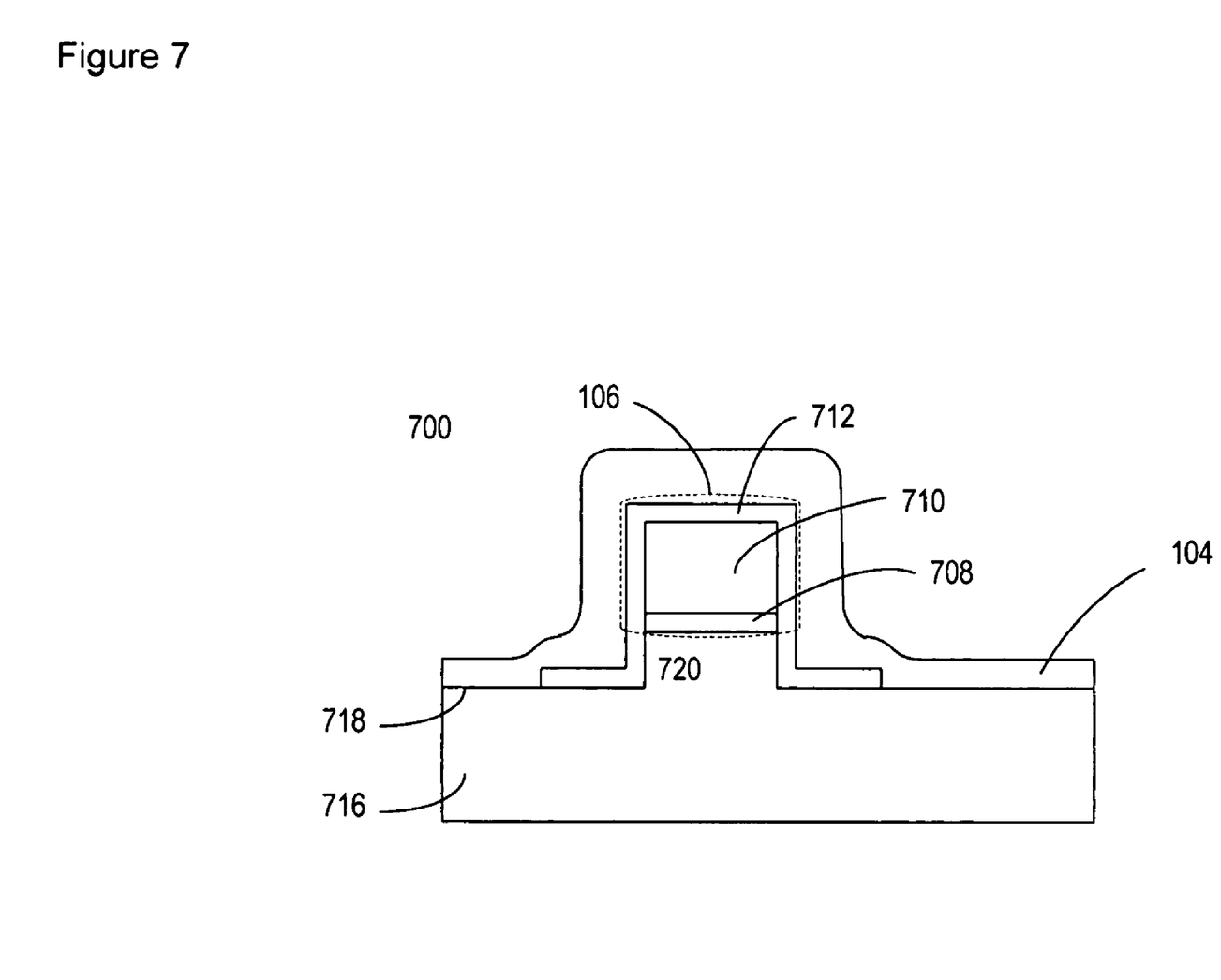
FIG. 7 depicts a fourth variation of the waveguide depicted in FIG. 2.

FIG. 7 depicts a cross-sectional view, orthogonal to the axis of signal propagation, of stripe waveguide 700, which is yet another variation of waveguide 200. In stripe waveguide 700, lower cladding 104 is replaced by lower cladding 716, which includes planar field region 718 and raised region 720. Layer 104 forms an upper cladding for waveguide 700.

As depicted in FIG. 7, composite guiding region 106, which comprises layers 708, 710, and 712, is disposed on raised region 720. Layer 712 is a conformal layer that covers the top and sides of interposed layer 710 with a substantially equal thickness. Layer 712 also coats the sidewalls of raised region 720, creating a stress in raised region 720 that affects the stress configuration in composite guiding region 106. The height of raised region 720 and the material and thickness of layer 712 are chosen such that the modal birefringence of composite guiding region 106 is reduced to a low level.

In FIG. 7, layer 712 is shown covering some amount of planar field region 718; however, it will be clear to those skilled in the art, after reading this specification, how to make and use other embodiments of the present invention wherein layer 712 exists only on the top and sidewalls of raised region 720 and layers 708 and 710, or alternatively extends for a suitable distance beyond the edge of composite guiding region 106.

Table 1 below provides dimensions of the various layers of waveguides 500, 600, and 700, for an embodiment in which:

the lower cladding layer is thermally-grown silicon dioxide;

the outer core lower portion (of the composite guiding region) is silicon nitride;

the inner core (of the composite guiding region) is TEOS;

the outer core upper portion (of the composite guiding region is silicon nitride;

the widths of the composite guiding regions listed for waveguides 600 and 700 include the thickness of the outer core deposited on the sidewalls of the inner core; and the upper cladding layer comprises TEOS and an additional lower stress glass such as BPSG.

More particularly, Table 1 provides ranges for the thickness of the various layers, wherein thicknesses within the ranges will provide a waveguide having a relatively low modal birefringence. Furthermore, the preferred thickness will yield a relatively low modal birefringence in comparison within other thicknesses within the indicated range.

TABLE 1

Design parameters for surface waveguide embodiments

| | | Raised Feature Dimensions (nm) | | Lower Cladding Thickness | Upper Cladding Thickness | Outer Core Lower Portion Thickness | Outer Core Upper Portion Thickness | Inner Core Thickness | Comp. Guiding Region Width |
|---|---|---|---|---|---|---|---|---|---|
| | | Width | height | (nm) | (nm) | (nm) | (nm) | (nm) | (nm) |
| Ridge Waveguide 500 | Range Preferred | N/A | N/A | 100–30,000 5,000 | 100–1350 5,000 | 10–350 250 | 10–350 250 | 100–1000 200 | 10–2000 1000 |
| Stripe Waveguide 600 | Range Preferred | N/A | N/A | 100–30,000 5,000 | 100–1350 5,000 | 10–350 250 | 10–350 250 | 100–1000 700 | 100–1000 700 |
| Stripe Waveguide 700 | Range Preferred | 10–2000 800 | 0–2000 800 | 100–30,000 5,000 | 100–1350 5,000 | 10–350 250 | 10–350 250 | 100–1000 300 | 100–1000 300 |

It will be clear to those skilled in the art, after reading this specification how to make and use other embodiments of the present invention comprising layers chosen from any of the following list of materials, including, but not limited to, stoichiometric and non-stoichiometric compounds of silicon nitride, silicon dioxide, TEOS, silicon, polysilicon, silicon carbide, silicon monoxide, silicon-rich silicon nitride, indium phosphide, gallium arsenide, indium-gallium arsenide, indium-gallium-arsenide-phosphide, lithium niobate, silicon oxy-nitride, phosphosilicate glass, and BPSG.

Figure 8A:
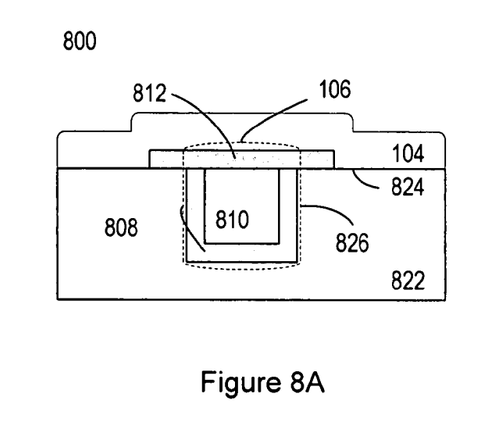
FIG. 8A depicts a fifth variation of the waveguide depicted in FIG. 2.

FIG. 8A depicts inverted-ridge waveguide 800, which is a variation of waveguide 200. FIGS. 8B–8G depict stages in the fabrication of inverted-ridge waveguide 800. In inverted-ridge waveguide 800, lower cladding 104 is replaced by lower cladding 822, which includes planar field region 824 and recessed region 826. Layer 104 forms an upper cladding for waveguide 800.

Referring to FIG. 8A, inverted-ridge waveguide 800 comprises composite guiding region 106, which includes outer core lower portion 808, inner core 810, and outer core upper portion 812. Composite guiding region 106 is disposed in recessed region 826 of lower cladding 822, and is covered by upper cladding 104.

Figures 8B, 8C:
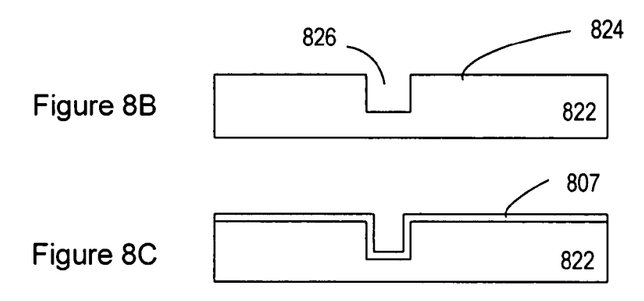
FIG. 8B–8G depicts the waveguide of FIG. 8A at various stages of fabrication.

FIG. 8B depicts layer 822 of material (e.g. silicon dioxide, etc.) in nascent inverted-ridge waveguide 800. Layer 822 is deposited or grown on a substrate (not depicted). Recessed region 826 is formed in layer 822 by removing material (e.g. through etching, ion milling, etc.) from a region of planar surface 824.

FIG. 8C depicts layer 807 of material, which is grown or deposited on layer 822 in a manner that results in layer 807 being a conformal layer. Layer 807 will form the outer core lower portion. See, operation 354 of method 300. In some embodiments, layer 807 is stoichiometric silicon nitride ($Si_3N_4$), which will deposit conformally on layer 822 in an LPCVD deposition furnace.

Figure 8D:
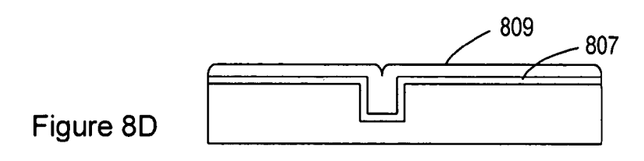

FIG. 8D depicts layer 809 of material, which is grown or deposited on layer 807 in a manner that results in layer 809 being a conformal layer. Layer 809 will form the inner core or interposed layer of composite guiding region 106. See, operation 356 of method 300. In some embodiments, layer 809 is TEOS which will deposit conformally on layer 807 in an LPCVD deposition furnace.

Figure 8E:
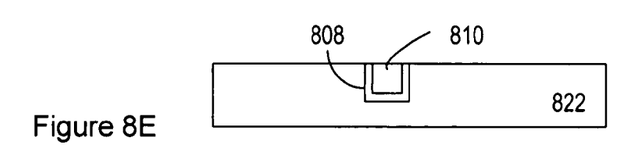

FIG. 8E depicts layers 807 and 809 after patterning, which defines the shape of outer core lower portion 808 and inner core 810 of composite guiding region 106. See operations 354 and 356 of method 300.

Figure 8F:
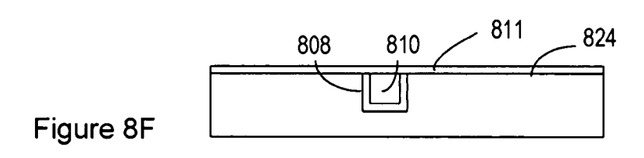

FIG. 8F depicts layer 811 of material, which is grown or deposited on planar surface 824 of layer 822, outer core lower portion 808, and inner core 810. See, operation 358 of method 300. In some embodiments in which layer 807 is stoichiometric silicon nitride, layer 811 comprises a second conformal layer of stoichiometric silicon nitride. After deposition of layer 811, inner core 810 is completely surrounded by outer core material, thereby completing composite guiding region 106.

Figure 8G:
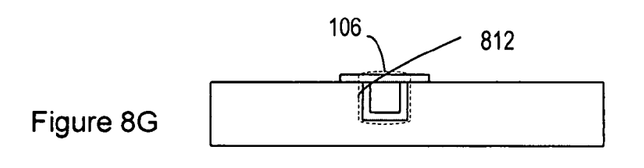

FIG. 8G depicts layer 811 after patterning, wherein the shape of outer cladding upper portion 812 is defined. See, operation 358 of method 300. After patterning, layer 812 extends beyond the edge of composite guiding region 106 and is disposed on at least a portion of layer 822. Its presence on layer 822 affects the stress configuration in composite guiding region 106. The presence of layer 812 on layer 822, and the extent of its coverage, therefore provides an additional measure of control over stress in composite guiding layer 106. It will be clear to those skilled in the art, after reading this specification, how to make and use other embodiments of the present invention where layer 811 extends further along layer 822 (see, e.g., FIG. 4A) or is completely removed from planar field region 824 of layer 822, thereby forming a stripe waveguide embodiment of waveguide 200.

Inverted-ridge waveguide 800 takes final form as upper cladding 104 is grown or deposited on outer core upper portion 812. See, FIG. 8A and operation 362 of method 300. In some embodiments, upper cladding 104 is a combination of a second conformal layer of TEOS and a layer of a different glass having a lower stress, such as BPSG. In conjunction with lower cladding 822, upper cladding 104 confines propagating light to composite guiding region 106.

It will be clear to those skilled in the art, after reading this specification, how to make and use other embodiments of the present invention wherein the various layers of waveguide 800 are selected from the list of suitable materials provided above, as well as any other materials that are found to be suitable.

It will also be clear to those skilled in the art, after reading this specification, how to make and use other embodiments of the present invention that utilize air, rather than a layer of material, as upper cladding 104.

Table 2 below provides dimensions of the various layers of waveguide 800, for an embodiment in which:

the lower cladding layer is thermally-grown silicon dioxide;

the outer core lower portion (of the composite guiding region) is silicon nitride;

the inner core (of the composite guiding region) is TEOS;

the outer core upper portion (of the composite guiding region is silicon nitride;

the width of the composite guiding region listed includes the thickness of the outer core deposited on the sidewalls of the inner core; and the upper cladding layer comprises TEOS and an additional lower stress glass such as BPSG.

More particularly, Table 2 provides ranges for the thickness of the various layers, wherein thicknesses within the ranges will provide a waveguide having a relatively low modal birefringence. Furthermore, the preferred thickness will provide yield a relatively low modal birefringence in comparison within other thicknesses within the indicated range.

TABLE 2

Design parameters for one embodiment of inverted-ridge waveguide 800.

| | | Recessed Feature Dimensions (nm) | | Lower Cladding Thickness | Upper Cladding Thickness | Outer Core Lower Portion Thickness | Outer Core Upper Portion Thickness | Inner Core Thickness | Comp. Guiding Region Width |
|---|---|---|---|---|---|---|---|---|---|
| | | Width | height | (nm) | (nm) | (nm) | (nm) | (nm) | (nm) |
| Inverted-Ridge Waveguide 800 | Range | 200–2000 | 200–2000 | 100–30,000 | 100–1350 | 10–350 | 10–350 | 20–1850 | 40–4400 |
| | Preferred | 800 | 550 | 5,000 | 5,000 | 250 | 250 | 300 | 800 |

It is to be understood that the above-described embodiments are merely illustrative of the present invention and that many variations of the above-described embodiments can be devised by those skilled in the art without departing from the scope of the invention. For example, in this specification, numerous specific details are provided in order provide a thorough description and understanding of the illustrative embodiments of the present invention. Those skilled in the art will recognize, however, that the invention can be practiced without one or more of those details, or with other methods, materials, components, etc.

Furthermore, in some instances, well-known structures, materials, or operations are not shown or described in detail to avoid obscuring aspects of the illustrative embodiments. It is understood that the various embodiments shown in the Figures are illustrative, and are not necessarily drawn to scale. Furthermore, the particular features, structures, materials, or characteristics can be combined in any suitable manner in one or more embodiments. It is therefore intended that such variations be included within the scope of the following claims and their equivalents.

What is claimed is:

1. An article comprising:
   (a). a composite guiding region having at least three layers, wherein:
       two of said three layers have stress of the same sign;
       said two layers are separated by one or more interposed layers;
       said one or more interposed layers have stress of opposite sign relative to said two layers; and
       said interposed layers are suitable for guiding light based on the relative refractive indices of said interposed layers and said two layers;
   (b). a lower cladding, wherein said composite guiding region is disposed above said lower cladding; and
   (c). an upper cladding, wherein at least a portion of said upper cladding is disposed above said composite guiding region.

2. The article of claim 1, wherein at least one of said two layers comprises a first conformal layer.

3. The article of claim 2, wherein said one or more interposed layers comprise a second conformal layer.

4. The article of claim 1, wherein the magnitude of said stress of said two layers is substantially equal.

5. The article of claim 1, wherein at least one of said two layers is stoichiometric silicon nitride.

6. The article of claim 1, wherein at least one of said one or more interposed layers is chosen from the group consisting of silicon dioxide, silicon, polysilicon, phosphosilicate glass, borosilicate glass, and borophosphorous silicate glass.

7. The article of claim 5, wherein one of said one or more interposed layers is silicon dioxide.

8. The article of claim 1, further comprising a layer of electro-optically active material, wherein said electro-optically active material is disposed on at least one of said three layers.

9. The article of claim 8, wherein said article is selected from the group consisting of a waveguide, an attenuator, a splitter, and an equalizer.

10. A surface waveguide comprising;
    a lower cladding layer comprising a lower cladding material; and
    a core comprising an inner core and an outer core, wherein:
        said inner core comprises one or more layers of inner core material;
        said inner core material supports propagation of light;
        said inner core material has a first stress;
        said outer core surrounds said inner core; and
        said outer core comprises an outer core material having a second stress of opposite sign relative to said first stress; and
    an upper cladding comprising an upper cladding material, wherein said lower cladding material and said upper cladding material have indices of refraction lower than the index of refraction of said outer core material.

11. The surface waveguide of claim 10, wherein one or more physical attributes of said inner core material and said outer core material, which physical attributes are selected from the group consisting of inner core layer thickness, outer core layer thickness, inner core stress level, outer core stress level, and type of material, are combined to provide a modal birefringence in said core of less than 0.0001.

12. The surface waveguide of claim 10, wherein said lower cladding material and said upper cladding material are individually selected from the group consisting of silicon dioxide, silicon, polysilicon, phosphosilicate glass, borosilicate glass, and borophosphorous silicate glass.

13. The surface waveguide of claim 10, wherein said inner core material and said outer core material are individually selected from the group consisting of silicon dioxide, silicon, silicon nitride, stoichiometric silicon nitride, silicon-rich silicon nitride, polysilicon, phosphosilicate glass, borosilicate glass, and borophosphorous silicate glass.

14. The surface waveguide of claim 10, wherein said inner core material is silicon dioxide.

15. The surface waveguide of claim 14, wherein said outer core material is stoichiometric silicon nitride.

16. A method of forming a surface waveguide comprising:
    forming a lower cladding on a substrate;
    forming a composite guiding region above said lower cladding, wherein forming said composite guiding region comprises:
    (a). depositing a first conformal layer comprising a first material having a first stress;
    (b). depositing on said first conformal layer a second conformal layer comprising a second material, wherein said second material has a second stress of opposite sign relative to said first stress; and
    (c). depositing on said second conformal layer a third conformal layer of a third material, wherein said third material has a third stress of the same sign relative to said first stress; and
    forming an upper cladding, wherein at least a portion of said upper cladding layer is disposed above said composite guiding region.

17. The method of claim 16, wherein said first material and said third material are the same material.

18. The method of claim 16, wherein the magnitude of the stress of said first material and said third material is substantially equal.

19. The method of claim 16, wherein said first material is stoichiometric silicon nitride and said second material is silicon dioxide and said third material is stoichiometric silicon nitride.

20. The method of claim 16, wherein said first material is silicon dioxide and said second material is stoichiometric silicon nitride and said third material is silicon dioxide.

21. The method of claim 16, further comprising depositing an electro-optically active material on a layer selected from said first conformal layer, said second conformal layer, and said third conformal layer.

22. The method of claim 21, wherein said electro-optically active material is zinc-oxide.

23. The method of claim 16, further comprising removing at least a portion of the thickness of said first material in at least one region.

24. The method of claim 16, further comprising removing at least a portion of the thickness of said second material in at least one region.

25. The method of claim 16, further comprising removing at least a portion of the thickness of said third material in at least one region.

26. The method of claim 16, further comprising forming a topography on said surface prior to deposition of said first conformal layer of first material, said topography having a field region and at least one recessed feature.

27. The method of claim 26, wherein at least one of said first conformal layer and said second conformal layer substantially fill said recessed feature.

28. The method of claim 16, further comprising forming a topography on said surface prior to deposition of said first conformal layer of first material, said topography having a field region and at least one raised feature.

29. A method of reducing modal birefringence in a surface waveguide comprising;
   forming a composite guiding region comprising an inner core of a first material surrounded by an outer core of a second material wherein:
   said inner core has a first stress; and
   said first material supports propagation of light; and
   said outer core has a second stress having opposite sign relative to said first stress; and
   said second stress compensates said first stress such that the modal birefringence of said composite guiding region is less than 0.0001.

30. The method of claim 29, wherein said first material is silicon dioxide and said second material is stoichiometric silicon nitride.

31. The method of claim 29, wherein said first material is stoichiometric silicon nitride and said second material is silicon dioxide.

* * * * *